(12) United States Patent
O'Brien et al.

(10) Patent No.: US 10,013,364 B1
(45) Date of Patent: Jul. 3, 2018

(54) SECURING DATA USING PER TENANT ENCRYPTION KEYS

(71) Applicant: EMC IP Holding Company LLC, Hopkinton, MA (US)

(72) Inventors: Walter O'Brien, Westborough, MA (US); Gregory W. Lazar, Upton, MA (US); Thomas Dibb, Rutland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 216 days.

(21) Appl. No.: 14/751,315

(22) Filed: Jun. 26, 2015

(51) Int. Cl.
| G06F 12/14 | (2006.01) |
| H04L 9/14 | (2006.01) |
| H04L 29/06 | (2006.01) |
| G06F 21/62 | (2013.01) |
| G06F 17/30 | (2006.01) |

(52) U.S. Cl.
CPC ............ *G06F 12/1408* (2013.01); *H04L 9/14* (2013.01); *G06F 17/30091* (2013.01); *G06F 21/6218* (2013.01); *G06F 2212/1052* (2013.01); *H04L 63/061* (2013.01); *H04L 63/10* (2013.01); *H04L 2209/24* (2013.01)

(58) Field of Classification Search
CPC ......... H04L 63/10; H04L 63/061; H04L 9/14; H04L 2209/24; G06F 21/6218; G06F 17/30091; G06F 12/1408; G06F 2212/1052
See application file for complete search history.

(56) References Cited

U.S. PATENT DOCUMENTS

| 8,117,464 B1 * | 2/2012 | Kogelnik ............ H04L 63/0428 380/284 |
| 8,291,490 B1 | 10/2012 | Ahmed et al. |
| 8,321,921 B1 | 11/2012 | Ahmed et al. |
| 8,336,089 B1 | 12/2012 | Ahmed et al. |
| 8,352,941 B1 | 1/2013 | Protopopov et al. |
| 8,635,465 B1 | 1/2014 | Juels et al. |
| 8,706,701 B1 | 4/2014 | Stefanov et al. |
| 8,706,800 B1 | 4/2014 | Ahmed et al. |
| 8,719,590 B1 | 5/2014 | Faibish et al. |
| 8,805,951 B1 | 8/2014 | Faibish et al. |
| 8,838,556 B1 | 9/2014 | Reiner et al. |
| 8,978,159 B1 | 3/2015 | van Dijk et al. |

(Continued)

*Primary Examiner* — Carl G Colin
*Assistant Examiner* — Gary E Lavelle
(74) *Attorney, Agent, or Firm* — BainwoodHuang

(57) ABSTRACT

One embodiment is directed to a technique which secures data on a set of storage drives of a data storage system. The technique involves encrypting data from a first tenant using a first tenant key to form first tenant encrypted data and storing the first tenant encrypted data on the set of storage drives. The technique further involves encrypting data from a second tenant using a second tenant key to form second tenant encrypted data and storing the second tenant encrypted data on the set of storage drives, the first tenant being different from the second tenant, and the first tenant key and the second tenant key being per tenant keys which are different from each other. The technique further involves destroying the first tenant key to prevent the first tenant encrypted data stored on the set of storage drives from being decrypted while maintaining the second tenant key to enable decryption of the second tenant encrypted data stored on the set of storage drives.

16 Claims, 5 Drawing Sheets

(56) References Cited

U.S. PATENT DOCUMENTS

| | | | |
|---|---|---|---|
| 8,997,096 | B1 | 3/2015 | Protopopov et al. |
| 9,043,793 | B1 | 5/2015 | Field et al. |
| 9,116,888 | B1 | 8/2015 | Wang et al. |
| 9,223,612 | B1* | 12/2015 | Feldman .................. G06F 9/465 |
| 9,225,529 | B1 | 12/2015 | Natanzon et al. |
| 2006/0143476 | A1* | 6/2006 | McGovern .......... G06F 21/6218 713/191 |
| 2012/0117384 | A1* | 5/2012 | Hirsch .................... G06F 21/62 713/167 |
| 2013/0067242 | A1* | 3/2013 | Lyakhovitskiy ........ G06F 21/00 713/193 |
| 2013/0247222 | A1* | 9/2013 | Maksim .............. G06F 21/6218 726/28 |
| 2014/0115258 | A1* | 4/2014 | Week ................ G06F 17/30159 711/133 |
| 2015/0326547 | A1* | 11/2015 | Carlson ................ H04L 63/061 713/171 |

* cited by examiner

SECURING DATA USING PER TENANT ENCRYPTION KEYS

BACKGROUND

A typical data storage array includes storage processors (SPs) and storage drives. The SPs process input/output (I/O) requests such as small computer system interface (SCSI) commands from host computers in order to store host data into the storage drives and load host data from the storage drives on behalf of one or more host computers.

Some data storage arrays encrypt data using unique encryption keys for each storage drive, i.e., per drive keys. That is, to store host data on a particular storage drive, circuitry of the data storage array encrypts the host data using a per drive key assigned to that storage drive and stores the encrypted host data on that storage drive. Likewise, to store host data on a different storage drive, circuitry encrypts the host data using a different per drive key assigned to that different storage drive and stores the encrypted host data on that different storage drive. Accordingly, if a storage drive is ever removed from the data storage array (e.g., misplaced, lost, stolen, etc.), the per drive key assigned that storage drive can be destroyed to keep the host data on that storage drive secure.

SUMMARY

Unfortunately, there are deficiencies to the above-described conventional approach of securing host data simply using per drive keys. Along these lines, some data storage equipment shares certain resources among multiple tenants (e.g., different departments within an enterprise, different host computers, different virtual machines, etc.).

For example, some data storage arrays include a first storage tier of flash drives and a second storage tier of magnetic drives. During operation, the SPs may place the more frequently accessed host data from multiple tenants on the first storage tier of flash drives. Likewise, the SPs may place less frequently accessed host data from the multiple tenants on the second storage tier of magnetic drives. With such sharing of storage resources, the host data of a single tenant that is removed cannot be secured by simply destroying per drive keys since non-removed tenants would not be able to access their host data from the storage tiers.

As another example, some data storage arrays form cache memory using a combination of volatile random access memory and flash memory from flash drives. Here, the SPs may copy the more frequently accessed host data of the multiple tenants from secondary storage into the flash memory which forms the cache memory. Again, with such sharing of storage resources, the host data of a single tenant that is removed cannot be secured by simply destroying per drive keys since the non-removed tenants would not be able to access their host data.

In contrast to the above-described conventional approach to securing host data simply using per drive keys, improved techniques are directed to securing data on a set of storage drives using unique tenant encryption keys, i.e., per tenant keys. Here, each tenant has its data encrypted using a unique per tenant key. Accordingly, if a tenant is removed, the unique per tenant key used by that tenant can be destroyed in order to secure that tenant's data. As a result, other data that may be stored on the same storage resources (e.g., the same storage drives) using other per tenant keys used by other tenants remains available for access by the other tenants.

One embodiment is directed to a method of securing data on a set of storage drives of a data storage system. The method includes encrypting data from a first tenant using a first tenant key to form first tenant encrypted data and storing the first tenant encrypted data on the set of storage drives. The method further includes encrypting data from a second tenant using a second tenant key to form second tenant encrypted data and storing the second tenant encrypted data on the set of storage drives, the first tenant being different from the second tenant, and the first tenant key and the second tenant key being per tenant keys which are different from each other. The method further includes destroying the first tenant key to prevent the first tenant encrypted data stored on the set of storage drives from being decrypted while maintaining the second tenant key to enable decryption of the second tenant encrypted data stored on the set of storage drives.

In some arrangements, the data storage system includes (i) the set of storage drives and (ii) other storage which together form computer memory to store tenant data in response to automated data placement operations. For example, the tenant data can be placed among different types of storage drives (e.g., flash drives, SAS drives, near-line SAS drives, etc.) forming different storage tiers. In other arrangements, the tenant data can be placed among some flash drives which provide flash memory used for caching host data. In yet other arrangements, the tenant data is placed among different types of storage drives forming different storage tiers, and also on flash drives which provide flash memory used for caching host data.

It should be understood that encryption/decryption using the per tenant keys can be performed in a variety of locations. Examples of suitable encryption/decryption locations include the processing circuitry of SPs, offload hardware modules, back-end circuitry which is disposed between the SPs and the storage drives, self-encrypting drives (SEDs), and so on.

In some arrangements, two levels of encryption are utilized. In particular, different per tenant keys are used to encrypt and decrypt the data for each tenant, and per drive keys are used to encrypt and decrypt the data for each storage drive. Accordingly, if a particular tenant is removed, the per tenant key for that tenant can be destroyed to secure that tenant's data. Additionally, if a particular storage drive is removed, the per drive key for that storage drive can be destroyed to secure the data on that storage drive.

Another embodiment is directed to electronic data storage circuitry which includes a set of storage drives, memory, and processing circuitry coupled to the set of storage drives and the memory. The memory stores instructions which, when carried out by the processing circuitry, cause the processing circuitry to:

(A) encrypt data from a first tenant using a first tenant key to form first tenant encrypted data and store the first tenant encrypted data on the set of storage drives, (B) encrypt data from a second tenant using a second tenant key to form second tenant encrypted data and store the second tenant encrypted data on the set of storage drives, the first tenant being different from the second tenant, and the first tenant key and the second tenant key being per tenant keys which are different from each other, and (C) destroy the first tenant key to prevent the first tenant encrypted data stored on the set of storage drives from being decrypted while maintaining the second tenant key to enable decryption of the second tenant encrypted data stored on the set of storage drives.

Yet another embodiment is directed to a computer program product having a non-transitory computer readable medium which stores a set of instructions to secure data on a set of storage drives. The set of instructions, when carried out by computerized circuitry, causes the computerized circuitry to perform a method of:

(A) encrypting data from a first tenant using a first tenant key to form first tenant encrypted data and storing the first tenant encrypted data on the set of storage drives;

(B) encrypting data from a second tenant using a second tenant key to form second tenant encrypted data and storing the second tenant encrypted data on the set of storage drives, the first tenant being different from the second tenant, and the first tenant key and the second tenant key being per tenant keys which are different from each other; and (C) destroying the first tenant key to prevent the first tenant encrypted data stored on the set of storage drives from being decrypted while maintaining the second tenant key to enable decryption of the second tenant encrypted data stored on the set of storage drives.

It should be understood that, in the cloud context, at least some of the electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in securing data using per tenant encryption keys.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to securing data on a set of storage drives using tenant encryption keys, i.e., per tenant keys. In accordance with this technique, each tenant has its data encrypted using a unique per tenant key. Accordingly, if a tenant is removed, the unique per tenant key used by that tenant can be destroyed in order to secure that tenant's data. As a result, other data that may be stored on the same storage resources (e.g., the same storage drives) using other per tenant keys used by other tenants remains available for access by the other tenants.

Figure 1:
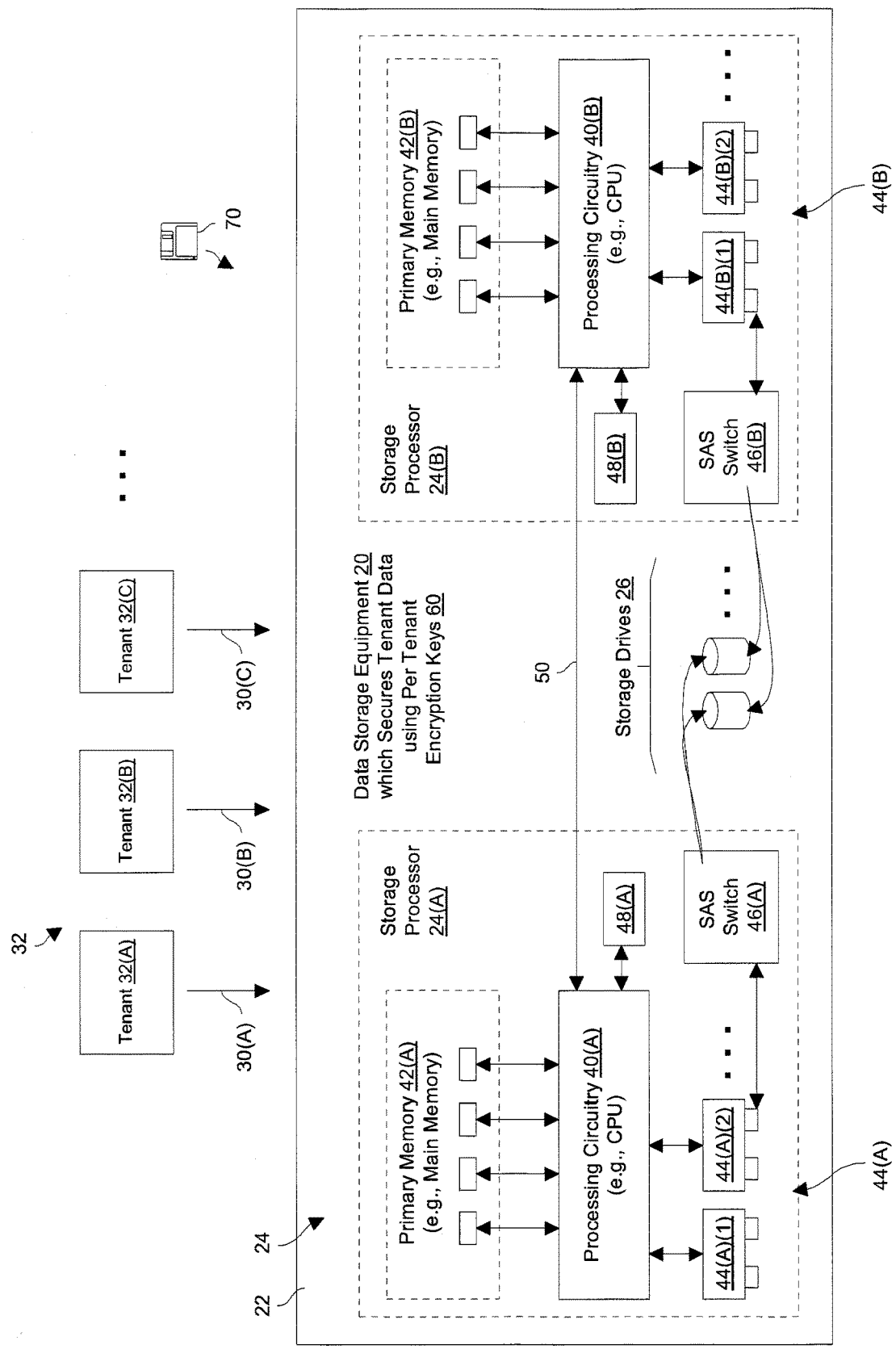
FIG. 1 is a block diagram of a data storage system which secures data using tenant encryption keys.

FIG. 1 shows data storage equipment 20 which is suitable for securing data on a set of storage drives using per tenant keys. The data storage equipment 20 includes an enclosure 22, a pair of physical storage processors (SPs) 24(A), 24(B) (collectively, SPs 24), and a set of storage drives 26.

The enclosure 22 is constructed and arranged to house and support the other data storage equipment components. In some arrangements, the enclosure 22 (e.g., a frame, a chassis, etc.) has a rack mount form factor, and is suitable for abutting other rack mount enclosures for expansion purposes (e.g., disk-array enclosures, input/output (I/O) expansion enclosures, etc.).

It should be understood that the enclosure 22 may include other components as well but which are omitted from FIG. 1 for simplicity (e.g., redundant power supplies, fan units, battery units, etc.). In some arrangements, there is redundancy among these components in order to enable the data storage equipment 22 to remain operational (i.e., to continue to perform data storage operations) even after sustaining one or more component failures.

Each SP 32 is constructed and arranged to perform data storage operations in response to respective I/O requests 30, e.g., small computer system interface (SCSI) commands, from different tenants 32. Along these lines, tenant 32(A) provides I/O requests 30(A) to the data storage equipment 20, tenant 32(B) provides I/O requests 30(B) to the data storage equipment 20, tenant 32(C) provides I/O requests 30(C) to the data storage equipment 20, and so on. It should be understood that suitable tenants 30 include different departments of an enterprise (e.g., finance, sales/marketing, engineering, etc.), different companies, different host computers, different virtual machines, other separable electronic entities that consume data storage resources, and so on.

It should be understood that each SP 24 includes a variety of components. Along these lines, the SP 24(A) includes processing circuitry 40(A) (e.g., a CPU, a set of microprocessors, etc.), primary memory 42(A) (e.g., random access memory or RAM), I/O expansion circuitry 44(A)(1), 44(A)(2), . . . (collectively, I/O circuitry 44(A)), a serial attached SCSI (SAS) switch 46(A), and an offload hardware module 48(A). Similarly, the SP 24(B) includes processing circuitry 40(B), primary memory 42(B), I/O expansion circuitry 44(B)(1), 44(B)(2), . . . (collectively, I/O circuitry 44(B)), a SAS switch 46(B), and an offload hardware module 48(B).

The set of storage drives (or devices) 26 is constructed and arranged to store data on behalf of the tenants 30. Examples of suitable storage drives 26 include flash memory drives, magnetic disk drives, combinations thereof, and the like.

In some arrangements, the set of storage drives 26 includes storage drives of different speeds in order to form different storage tiers. In one situation, the set of storage drives 26 includes flash drives to form a tier of flash memory to hold frequently accessed or "hot" data, SAS drives to form a tier of SAS memory to hold moderately accessed or "medium" data, and near-line SAS drives to form a tier of near-line SAS memory to hold infrequently accessed or "cool" data.

Additionally, in some arrangements, the set of storage drives 26 includes flash memory drives, and some of the flash storage provided by the flash memory drives is used as cache memory (i.e., an extension of the primary memory 42(A), 42(B)). That is, the flash storage is used to extend the existing cache capacity provided by traditional RAM modules.

In some arrangements, the SPs 24 communicate with each other via a communications pathway 50. For example, such a communications pathway 50 enables the SPs 24 to mirror certain contents of each other's cache.

During operation, the data storage equipment 20 performs load and store operations in response to the I/O requests 30 from the tenants 32. Along these lines, the data storage equipment 20 maintains a different per tenant encryption key 60 for each tenant 30 (i.e., cryptographic keys which are used to encrypt and decrypt data for different tenants 32). Prior to storing data on the set of storage drives 26 for a particular tenant 32, the data storage equipment 20 encrypts that data and stores only the encrypted data. To provide that data back to the particular tenant 32 (e.g., during a subsequent read and a cache miss), the data storage equipment 20 reads the encrypted data from the set of storage drives 26 and decrypts the data. Accordingly, any tenant data at rest on the set of storage drives 26 is encrypted by the per tenant encryption key 60 of the owning tenant 32 and is thus secure.

Additionally, if a tenant 32 is ever removed (e.g., migrated off of the data storage equipment 20, deleted, retired, etc.), the per tenant encryption key 60 for that tenant 32 is destroyed while the per tenant encryption keys 60 of the remaining (i.e., non-removed) tenants 32 are maintained. Accordingly, the data of the removed tenant 32 remains secure (e.g., the data remains encrypted and thus un-accessible by others).

It should be understood that at least some of the operation of the data storage equipment 20 can be guided by software which is delivered to the data storage equipment 20 via a computer program product 70. Such a computer program product 70 has a non-transitory and non-volatile computer readable medium which stores a set of instructions to control one or more operations of the data storage equipment 20. Examples of suitable computer readable storage media include tangible articles of manufacture and apparatus which store instructions in a non-volatile manner such as CD-ROM, flash memory, disk memory, tape memory, and the like.

It should be further understood that there are a variety of locations that are suitable for performing tenant data encryption/decryption using the per tenant encryption keys 60. Preferably, the per tenant encryption keys 60 are stored in a location which is different than the encrypted tenant data (e.g., in firmware within the SPs, externally by a key management server, etc.).

In some arrangements, the processing circuitry 42(A), 42(B) of the SPs 24 are provisioned with the per tenant encryption keys 60, and performs the per tenant key cryptographic operations. Performing the per tenant key cryptographic operations within the processing circuitry 42(A), 42(B) of the SPs 24 alleviates the processing burden associated with performing these operations elsewhere, as well as enables the processing circuitry 42(A), 42(B) to perform optimizations such as data deduplication, data compression, etc. prior to encryption.

In some arrangements, the I/O expansion circuitry 44(A), 44(B) is provisioned with the per tenant encryption keys 60, and performs the per tenant key cryptographic operations. Performing the per tenant key cryptographic operations within the I/O expansion circuitry 44(A), 44(B) alleviates the processing burden associated with performing these operations in the processor circuitry 42(A), 42(B), but nevertheless enables the processing circuitry 42(A), 42(B) to perform optimizations such as data deduplication, data compression, etc. prior to encryption. In some arrangements, the I/O expansion circuitry 44(A), 44(B) resides in separate hardware modules that are external to the SPs 24.

In some arrangements, the offload hardware circuitry 48(A), 48(B) is provisioned with the per tenant encryption keys 60, and performs the per tenant key cryptographic operations. Performing the per tenant key cryptographic operations within the I/O expansion circuitry 44(A), 44(B) alleviates the processing burden associated with performing these operations in the processor circuitry 42(A), 42(B), but nevertheless enables the processing circuitry 42(A), 42(B) to perform optimizations such as data deduplication, data compression, etc. prior to encryption. In some arrangements, the offload hardware circuitry 48(A), 48(B) resides in separate hardware modules that are external to the SPs 24.

Additionally, it should be understood that the above-described process of encrypting tenant data using per tenant encryption keys 60 can be used in combination with per drive encryption keys. That is, the tenant data can be doubly encrypted before being stored on the set of storage drives 26. Accordingly, if a tenant 32 is removed, the per tenant encryption key 60 for that tenant 32 is simply destroyed. Furthermore, if a drive 26 is removed, the per drive encryption key for that drive 26 is destroyed.

Moreover, it should be understood that the encryption using the per tenant encryption keys 60 and the per drive encryption keys can be performed in different locations within the data storage equipment 20. For example, suppose that encryption of tenant data using the per tenant encryption keys 60 takes place in the processing circuitry 42(A), 42(B) or in the offload hardware circuitry 48(A), 48(B). In these situations, the encryption of the tenant data using the per drive encryption keys can take place in the I/O expansion circuitry 44(A), 44(B) or in the drives 26 themselves (e.g., via self-encrypting drives or SEDs), and so on. Further details will now be provided with reference to FIG. 2.

Figure 2:
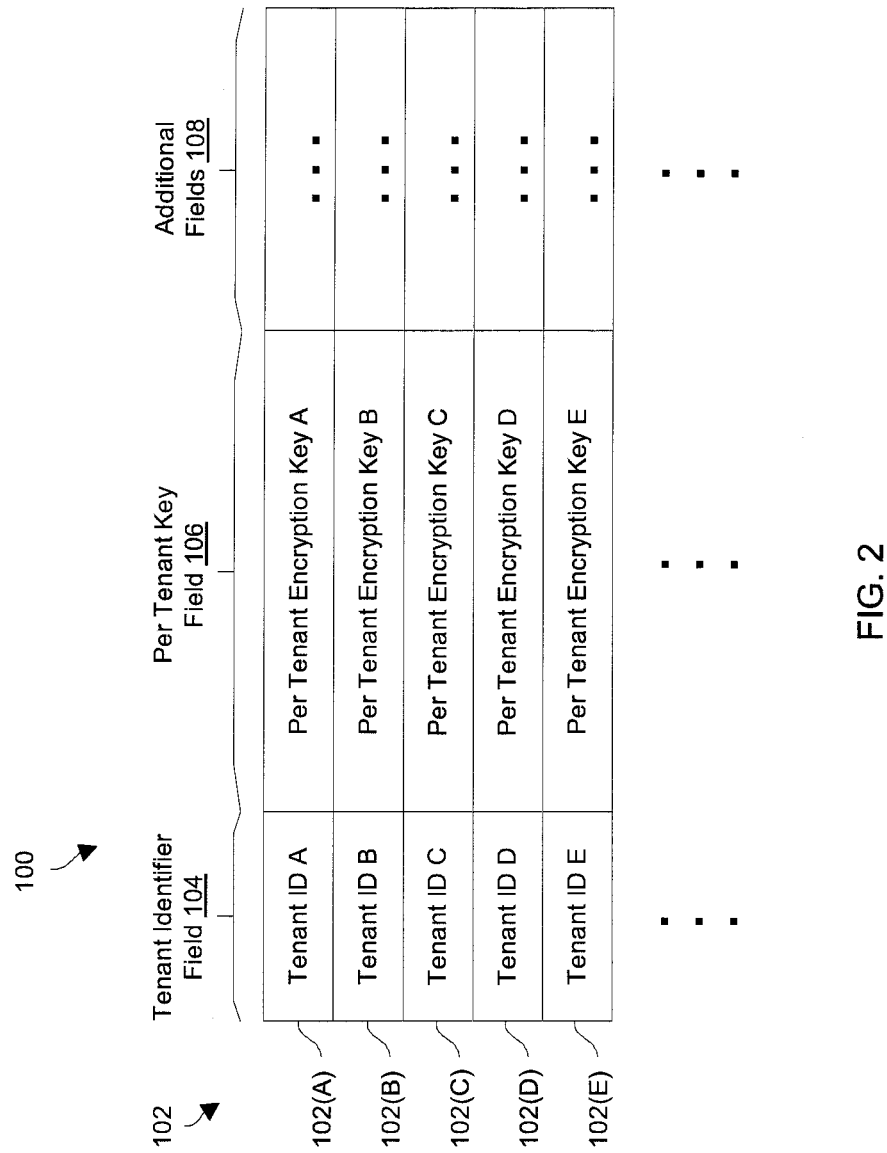
FIG. 2 is a block diagram of a tenant key database utilized by the data storage system of FIG. 1.

FIG. 2 shows a per tenant encryption key database 100 utilized by the data storage equipment 20 of FIG. 1. The per tenant encryption key database 100 includes entries 102(A), 102(B), 102(C), 102(D), 102(E), . . . (collectively entries 102) which contain tenant key information. In particular, each entry 102 includes a tenant identifier field 104 which holds a tenant identifier (or ID) which uniquely identifies a particular tenant 32 (also see FIG. 1), a per tenant key field 106 which holds the per tenant encryption key 60 assigned to that tenant 32, and other fields 108 to hold other information regarding that tenant 32 (e.g., tenant names, key expiration data, LUNs/volumes/file systems/RAID groups/ etc. assigned to that tenant 32, and so on.

When a new tenant 32 is added to the data storage equipment 20, a new entry 102 is created in the per tenant encryption key database 100. Accordingly, the per tenant encryption key database 100 is able to safely maintain the per tenant encryption key 60 for that new tenant 32.

Additionally, when an existing tenant 32 is removed from the data storage equipment 20, the entry 102 in the per tenant encryption key database 100 associated with that tenant 32 is destroyed (e.g., the contents are erased, the entry is deleted, etc.). Accordingly, any data for the removed tenant 32 cannot be decrypted into a meaningful form. As a result, the data for the removed tenant 32 remains secure.

It should be understood that, with such per tenant key management, the data belonging to the removed tenant 32 remains safeguarded even though the data belonging to other non-removed tenants 32 remains accessible on the same set of storage drives 26 (FIG. 1). Such operation alleviates the need to immediately delete or zero out all of the storage locations consumed by the data of the removed tenant 32. Further details will now be provided with reference to FIGS. 3 and 4.

Figure 3:
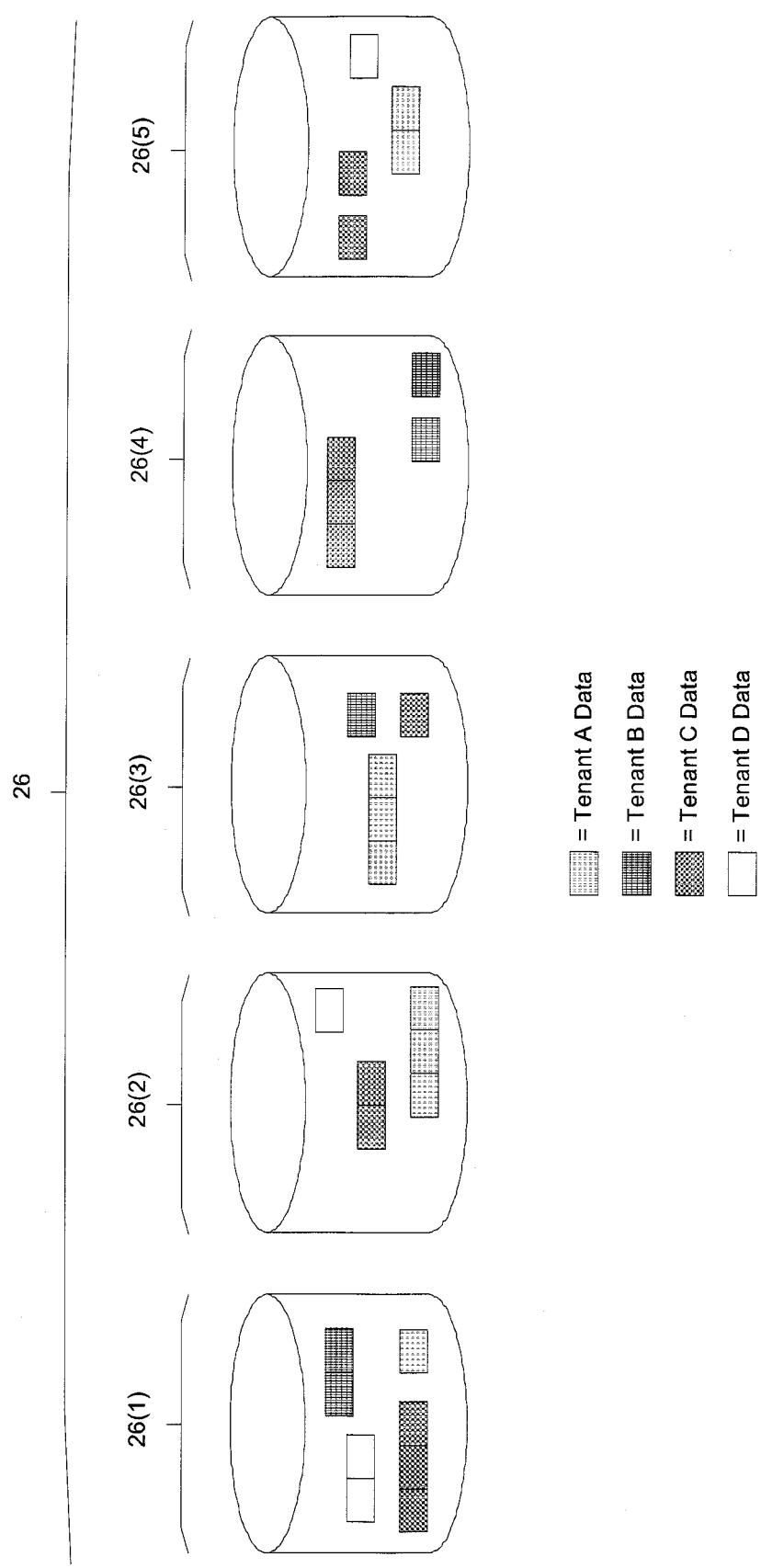
FIG. 3 is a block diagram of a set of storage drives of the data storage system of FIG. 1 storing example tenant data.
Figure 4:
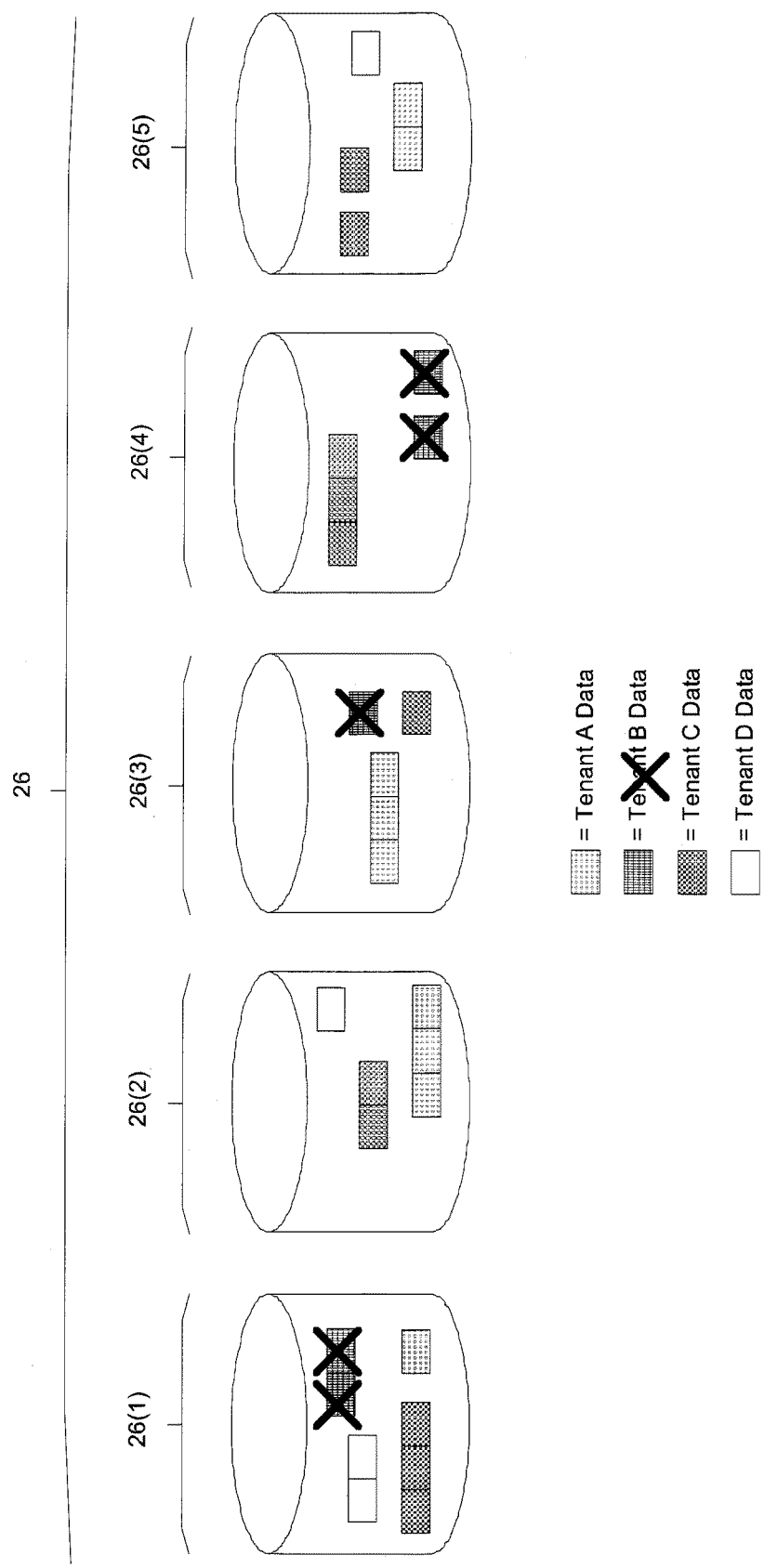
FIG. 4 is a block diagram of the set of storage drives of FIG. 3 after a tenant key is destroyed.

FIGS. 3 and 4 show an example set of storage drives 26 which store data for multiple tenants 32. FIG. 3 shows the set of storage drives 26 storing example tenant data while all of the per tenant encryption keys 60 in the per tenant encryption key database 100 remain available. FIG. 4 shows the set of storage drives 26 after a tenant 32 is removed and the per tenant encryption key 60 for that tenant 32 is destroyed.

As shown in FIG. 3, there are five storage drives 26(1), 26(2), 26(3), 26(4), 26(5) (collectively, drives 26) which store data on behalf of Tenant A, Tenant B, Tenant C, and Tenant D. In particular, the data owned by Tenant A is stored on the drives 26 in encrypted form using Tenant A's per tenant encryption key 60. Likewise, the data owned by Tenant B is stored on the drives 26 in encrypted form using Tenant B's per tenant encryption key 60, and so on. Along these lines, drive 26(1) includes data owned by multiple tenants (i.e., sharing of data storage resources). It should be understood that the data for each tenant may be stored in a variety of different forms such as a logical unit of storage (LUN) or a volume, a file system, a LUN which contains one or more file systems, a file, etc.

During operation, as a tenant 32 adds new data, circuitry of the data storage equipment 20 encrypts the data using that tenant's 32 per tenant encryption key 60, and then stores the encrypted data on the drives 26. Additionally, when a tenant 32 reads existing data, the circuitry of the data storage equipment 20 reads the encrypted data from the drives 26, decrypts the data using that tenant's 32 per tenant encryption key 60, and then provides the decrypted data to the tenant 32.

Now, suppose that Tenant B is removed from the data storage equipment 20. During the tenant removal process, the entry 102 for Tenant B is destroyed (e.g., see entry 102(B) in FIG. 2). As a result, the data that belonged to Tenant B on the drives 26 is no longer accessible. That is, the data can no longer be decrypted and thus is unreadable and unusable by anyone (as illustrated by the X's in FIG. 4). However, it is worth noting that following such destruction of the per tenant encryption key 60 from the drives 26, the data which belongs to the other non-removed tenants is still accessible from the same drives 26. For example, the drive 26(1) still holds data for Tenant A, Tenant C and Tenant D even though Tenant B has been removed and the per tenant encryption key 50 for Tenant B has been destroyed.

It should be understood that the above-described process of securing tenant data by destroying the per tenant encryption key 60 used by the removed tenant does not preclude other resource management operations that can be performed by the data storage equipment 20. For example, the data storage equipment 20 may still run a task or a process which zeroes out or reclaims the storage space previously consumed by the removed tenant to a pool of unused storage.

It should be further understood that the above-described process can be repeated for other tenants. Along these lines, one or more other tenants can be removed and the storage locations that contained data for those other tenants can be zeroed out/reclaimed as well. Such operations can be performed serially (e.g., before or after Tenant B's removal), in parallel with Tenant B's removal, and so on. Further details will now be provided with reference to FIG. 5.

Figure 5:
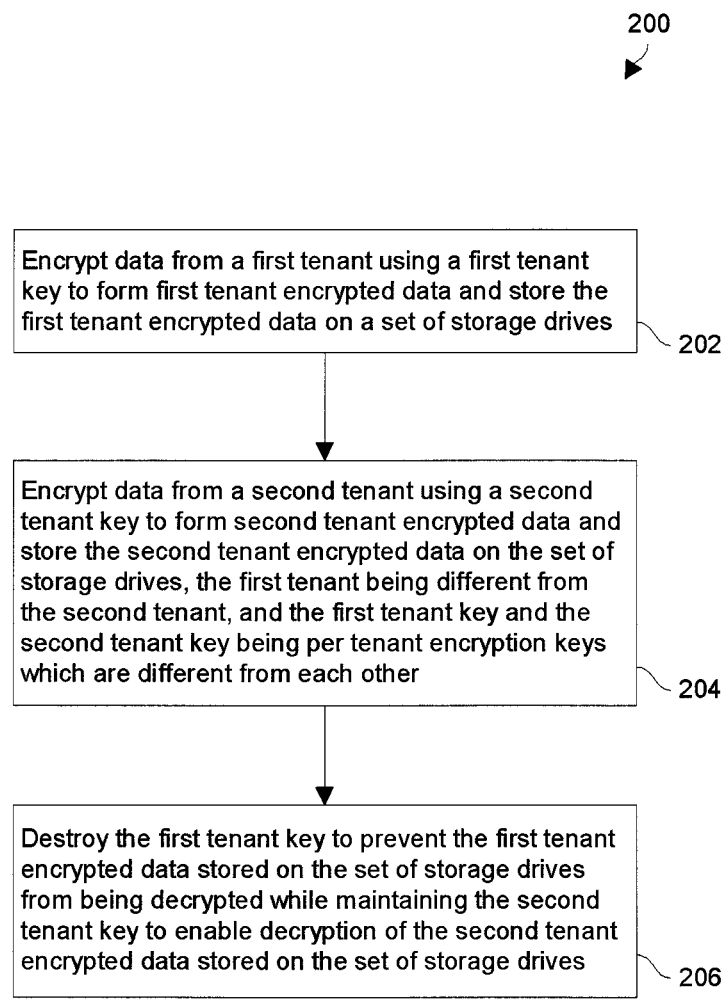
FIG. 5 is a flowchart of a procedure which is performed by the data storage system of FIG. 1.

FIG. 5 is a flowchart of a procedure 200 which is performed by the data storage equipment 20 to secure data of multiple tenants.

At 202, the data storage equipment 20 encrypts data from a first tenant using a first tenant key to form first tenant encrypted data and stores the first tenant encrypted data on the set of storage drives 26.

At 204, the data storage equipment 20 encrypts data from a second tenant using a second tenant key to form second tenant encrypted data and stores the second tenant encrypted data on the set of storage drives. The first tenant is different from the second tenant. Additionally, the first tenant key and the second tenant key are per tenant keys which are different from each other.

It should be understood that the activities of 202 and 204 can be performed in different orders and as part of normal automated data placement operations (e.g., where data is placed in a particular storage tier due to access frequency, where frequently accessed data is copied into flash memory which is accessed as cache memory, etc.). Additionally, prior to encryption using the per tenant keys, a variety of optimizations can be performed such as data deduplication, data compression, and so on. Furthermore, the data can be doubly encrypted/decrypted using per drive encryption keys in combination with the per tenant encryption keys.

At 206, the data storage equipment 20 destroys the first tenant key to prevent the first tenant encrypted data stored on the set of storage drives from being decrypted while maintaining the second tenant key to enable decryption of the second tenant encrypted data stored on the set of storage drives.

As described above, improved techniques are directed to securing data on a set of storage drives 26 using unique tenant encryption keys, i.e., per tenant keys 60. Here, each tenant 32 has its data encrypted using a unique per tenant key 60. Accordingly, if a tenant 32 is removed, the unique per tenant key 60 used by that tenant 32 can be destroyed in order to secure that tenant's data. As a result, other data that may be stored on the same storage resources (e.g., the same storage drives 26) using other per tenant keys 60 used by other tenants 32 remains available for access by the other tenants 32.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components disclosed herein are capable of being implemented in or "moved to" the cloud, i.e., to remote computer resources distributed over a network. Here, the various computer resources (e.g., the tenants 32) may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, in some ways, it should be understood that the above-described use of tenant encryption keys can be considered a specific use case of "per domain" keys which protect domains, where the domains have a finer granularity than that of a storage drive. That is, a system may protect a group of domains using per domain keys. Then, during removal of a particular domain from the system, the system destroys the per domain key for the particular domain (i.e., crypto shredding). Examples of suitable domains include those for objects, files, folders, and so on. Such modifications and enhancements are intended to belong to various embodiments of the disclosure.

What is claimed is:

1. In a data storage system, a method of securing data on a set of storage drives, the method comprising:
   encrypting data from a first tenant using a first tenant key to form first tenant encrypted data and storing the first tenant encrypted data on the set of storage drives;
   encrypting data from a second tenant using a second tenant key to form second tenant encrypted data and storing the second tenant encrypted data on the set of storage drives, each of the first tenant and the second tenant being one of a department within an enterprise, a host computer, and a virtual machine, the first tenant being different from the second tenant, and the first tenant key and the second tenant key being per tenant keys that are different from each other; and
   destroying the first tenant key to prevent the first tenant encrypted data stored on the set of storage drives from being decrypted while maintaining the second tenant key to enable decryption of the second tenant encrypted data stored on the set of storage drives,
   wherein the storing of the first tenant encrypted data on the set of storage drives includes:
      encrypting the first tenant encrypted data using per drive encryption keys that are different from the per tenant keys to form first tenant doubly-encrypted data; and
      storing the first tenant doubly-encrypted data on the set of storage drives, the data storage system including (i) processing circuitry configured to perform host input/output (I/O) operations on behalf of the first and second tenants, and (ii) I/O expansion circuitry, coupled to the processing circuitry, providing at least one additional input and output for the data storage system, and
   wherein the encrypting of the first tenant encrypted data using the per drive encryption keys includes:
      provisioning the I/O expansion circuitry with the per drive encryption keys;
      providing access to the first tenant encrypted data for the I/O expansion circuitry; and
      performing the encrypting of the first tenant encrypted data within the I/O expansion circuitry to form the first tenant doubly-encrypted data using the per drive encryption keys.

2. A method as in claim 1 wherein the data storage system includes (i) the set of storage drives and (ii) other storage which together form computer memory to store tenant data in response to automated data placement operations; and
   wherein storing the first tenant encrypted data on the set of storage drives includes performing an automated data placement operation which (i) selects a memory location on the set of storage drives over memory locations of the other storage and (ii) places the first tenant encrypted data in the selected memory location on the set of storage drives.

3. A method as in claim 2 wherein the set of storage drives includes flash memory;
   wherein the other storage includes volatile memory;
   wherein the computer memory which stores the tenant data is a host data cache formed by the flash memory and the volatile memory; and
   wherein performing the automated data placement operation includes caching the first tenant encrypted data in a flash memory location of the host data cache.

4. A method as in claim 2 wherein the set of storage drives includes flash memory;
   wherein the other storage includes magnetic disk drive memory;
   wherein the computer memory which stores the tenant data is tiered storage having a flash memory storage tier formed by the flash memory and a magnetic disk drive storage tier formed by the magnetic disk drive memory; and
   wherein performing the automated data placement operation includes saving the first tenant encrypted data in a flash memory location of the flash memory storage tier.

5. A method as in claim 2 wherein the encrypting of the data from the first tenant using the first tenant key includes (i) provisioning the processing circuitry with the first tenant key, and (ii) inputting unencrypted first tenant data into the processing circuitry to form the first tenant encrypted data, and
   wherein the encrypting of the data from the second tenant using the second tenant key includes (i) provisioning the processing circuitry with the second tenant key, and (ii) inputting unencrypted second tenant data into the processing circuitry to form the second tenant encrypted data.

6. A method as in claim 2 wherein the data storage system includes an offload cryptographic module coupled to the processing circuitry,
   wherein the encrypting of the data from the first tenant using the first tenant key includes (i) provisioning the offload cryptographic module with the first tenant key, and (ii) outputting unencrypted first tenant data from the processing circuitry into the offload cryptographic module to form the first tenant encrypted data, and
   wherein the encrypting of the data from the second tenant using the second tenant key includes (i) provisioning the offload cryptographic module with the second tenant key, and (ii) outputting unencrypted second tenant data from the processing circuitry into the offload cryptographic module to form the second tenant encrypted data.

7. A method as in claim 2 wherein the set of storage drives includes a set of cryptographic drives,
   wherein the encrypting of the data from the first tenant using the first tenant key and the storing of the first tenant encrypted data include (i) provisioning the set of cryptographic drives with the first tenant key, and (ii) outputting unencrypted first tenant data from the processing circuitry into the set of cryptographic drives, and
   wherein the encrypting of the data from the second tenant using the second tenant key and the storing of the second tenant encrypted data include (i) provisioning the set of cryptographic drives with the second tenant key, and (ii) outputting unencrypted second tenant data from the processing circuitry into the set of cryptographic drives.

8. A method as in claim 1 wherein the encrypting of the data from the first tenant using the first tenant key includes:
   provisioning the processing circuitry with the first tenant key;

inputting unencrypted first tenant data into the processing circuitry; and
performing the encrypting of the data from the first tenant within the processing circuitry to form the first tenant encrypted data using the first tenant key.

9. A method as in claim 1 wherein the encrypting of the data from the first tenant using the first tenant key includes:
provisioning the I/O expansion circuitry with the first tenant key;
providing access to unencrypted first tenant data for the I/O expansion circuitry; and
performing the encrypting of the data from the first tenant within the I/O expansion circuitry to form the first tenant encrypted data using the first tenant key.

10. A method as in claim 9 wherein the encrypting of the data from the second tenant using the second tenant key includes:
provisioning the I/O expansion circuitry with the second tenant key;
providing access to unencrypted second tenant data for the I/O expansion circuitry; and
performing the encrypting of the data from the second tenant within the I/O expansion circuitry to form the second tenant encrypted data using the second tenant key.

11. Electronic data storage circuitry, comprising:
a set of storage drives;
memory;
I/O expansion circuitry providing at least one additional input and output for the electronic data storage circuitry; and
processing circuitry coupled to the set of storage drives, the memory, and the I/O expansion circuitry, the memory storing instructions that, when carried out by the processing circuitry, cause the processing circuitry to:
encrypt data from a first tenant using a first tenant key to form first tenant encrypted data and store the first tenant encrypted data on the set of storage drives;
encrypt data from a second tenant using a second tenant key to form second tenant encrypted data and store the second tenant encrypted data on the set of storage drives, each of the first tenant and the second tenant being one of a department within an enterprise, a host computer, and a virtual machine, the first tenant being different from the second tenant, and the first tenant key and the second tenant key being per tenant keys that are different from each other;
destroy the first tenant key to prevent the first tenant encrypted data stored on the set of storage drives from being decrypted while maintaining the second tenant key to enable decryption of the second tenant encrypted data stored on the set of storage drives;
encrypt the first tenant encrypted data using per drive encryption keys that are different from the per tenant keys to form first tenant doubly-encrypted data;
store the first tenant doubly-encrypted data on the set of storage drives;
provision the I/O expansion circuitry with the per drive encryption keys;
output the first tenant encrypted data from the processing circuitry into the I/O expansion circuitry; and
performing the encrypting of the first tenant encrypted data within the I/O expansion circuitry using the per drive encryption keys.

12. Electronic data storage circuitry as in claim 11, further comprising:
other storage which, with the set of storage drives, forms computer memory to store tenant data in response to automated data placement operations; and
wherein the processing circuitry, when storing the first tenant encrypted data on the set of storage drives includes performing an automated data placement operation which (i) selects a memory location on the set of storage drives instead of memory locations of the other storage and (ii) places the first tenant encrypted data in the selected memory location on the set of storage drives.

13. Electronic data storage circuitry as in claim 12 wherein the set of storage drives includes flash memory;
wherein the other storage includes volatile memory;
wherein the computer memory which stores the tenant data is a host data cache formed by the flash memory and the volatile memory; and
wherein processing circuitry, when performing the automated data placement operation, is constructed and arranged to cache the first tenant encrypted data in a flash memory location of the host data cache.

14. Electronic data storage circuitry as in claim 12 wherein the set of storage drives includes flash memory;
wherein the other storage includes magnetic disk drive memory;
wherein the computer memory which stores the tenant data is tiered storage having a flash memory storage tier formed by the flash memory and a magnetic disk drive storage tier formed by the magnetic disk drive memory; and
wherein the processing circuitry, when performing the automated data placement operation, is constructed and arranged to save the first tenant encrypted data in a flash memory location of the flash memory storage tier.

15. Electronic data storage circuitry as in claim 11 wherein, after the first tenant key is destroyed to prevent the first tenant encrypted data stored on the set of storage drives from being decrypted, at least some of the first tenant encrypted data and at least some of the second tenant encrypted data reside on a common storage drive of the set of storage drives for a period of time.

16. A computer program product having a non-transitory computer readable medium that stores a set of instructions to manage data on a set of storage drives of a data storage system, the set of instructions, when carried out by computerized circuitry, causing the computerized circuitry to perform a method of:
encrypting data from a first tenant using a first tenant key to form first tenant encrypted data and storing the first tenant encrypted data on the set of storage drives;
encrypting data from a second tenant using a second tenant key to form second tenant encrypted data and storing the second tenant encrypted data on the set of storage drives, each of the first tenant and the second tenant being one of a department within an enterprise, a host computer, and a virtual machine, the first tenant being different from the second tenant, and the first tenant key and the second tenant key being per tenant keys that are different from each other; and
destroying the first tenant key to prevent the first tenant encrypted data stored on the set of storage drives from being decrypted while maintaining the second tenant key to enable decryption of the second tenant encrypted data stored on the set of storage drives,
wherein the storing of the first tenant encrypted data on the set of storage drives includes:

encrypting the first tenant encrypted data using per drive encryption keys that are different from the per tenant keys to form first tenant doubly-encrypted data; and storing the first tenant doubly-encrypted data on the set of storage drives, the data storage system including (i) processing circuitry configured to perform host input/output (I/O) operations on behalf of the first and second tenants, and (ii) I/O expansion circuitry, coupled to the processing circuitry, providing at least one additional input and output for the data storage system, and wherein the encrypting of the first tenant encrypted data using the per drive encryption keys includes:

provisioning the I/O expansion circuitry with the per drive encryption keys;

outputting the first tenant encrypted data from the processing circuitry into the I/O expansion circuitry; and performing the encrypting of the first tenant encrypted data within the I/O expansion circuitry using the per drive encryption keys.

\* \* \* \* \*